UNITED STATES PATENT OFFICE.

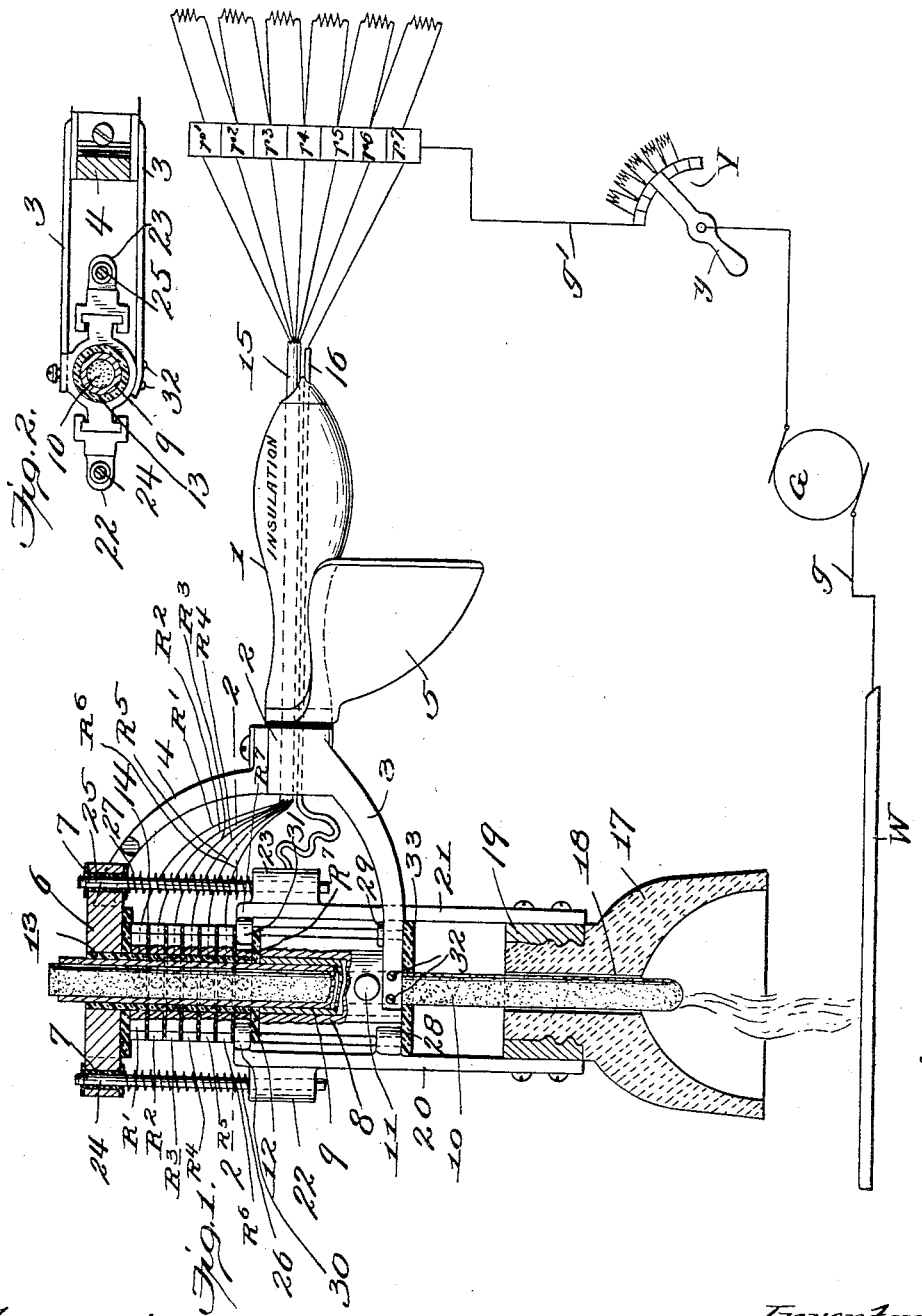

CHARLES L. COFFIN, OF PARKS, GEORGIA, ASSIGNOR TO ELECTRIC METAL WORKING COMPANY, OF DETROIT, MICHIGAN, A CORPORATION OF MICHIGAN.

ART OF ARC WELDING, HEATING, AND THE LIKE.

1,265,613.  Specification of Letters Patent.  Patented May 7, 1918.

Application filed April 5, 1916. Serial No. 89,130.

*To all whom it may concern:*

Be it known that I, CHARLES L. COFFIN, a citizen of the United States, residing at Parks, in the county of White and State of Georgia, have invented new and useful Improvements in the Art of Arc Welding, Heating, and the like, of which the following is a specification.

My present invention relates to the art of welding, heating or otherwise treating metals or materials by the electric arc. The primary object of the invention is to so utilize the heat of an electric arc to heat the material to be operated upon that an excessive rush of current is avoided, both at the commencement and throughout the heating operation. According to the present invention, it is impossible to bring one electrode of the arc into contact or into close proximity to the other electrode without introducing protective resistance into the circuit of the arc, either prior to the establishment of the arc, or during the maintenance of the arc. Also, according to the present invention, the amount of current to maintain the arc may be varied or regulated automatically as the distance between the electrodes is varied, thus providing convenient and certain regulation.

To these and other ends, the invention consists in a novel method, a novel system of operation, and novel apparatus for carrying the method and system into practice, all as will be hereinafter described, the invention being defined more particularly in the claims at the end of this specification.

In the accompanying drawing:—

Figure 1 is a side elevation, partly in section, of one form of apparatus capable of use in carrying the invention into practice; and Fig. 2 represents a section on the line 2—2 of Fig. 1.

Similar parts are designated by the same reference characters in the several views.

The method provided by the present invention may be carried into practice in connection with different modes of treating metals or materials by the electric arc. The method may also be carried into practice by the aid of apparatus of different kinds or types. Also, the apparatus which is preferably used in carrying the method into practice may be of different kinds or types, and while that shown is in the form of a portable or hand tool, it is to be understood that the invention is applicable to machines used for welding, heating or otherwise treating metals or materials by the electric arc. It is also to be understood that while, in the present instance, the metal or material to be treated acts as one electrode of the arc, the invention is applicable to methods wherein the electrodes of the arc are independent of or extraneous to the metal or material under treatment. Modifications or variations of the method or the apparatus may be made or will suggest themselves to those skilled in the art, but such modifications or variations are contemplated and will be included within the scope of the claims.

According to the present invention, as shown, one of the electrodes is provided with means for preventing contact of this electrode with the other electrode without first operating a protective starting device which will introduce protective resistance into the circuit which includes the electrodes prior to the establishment of the arc. Preferably, the electrode has a predetermined or limited range of travel and it is impossible to wholly remove the protective resistance from the circuit within this range of travel.

Heretofore, it has been the custom to provide automatic or hand-operated protective resistance, which resistance, together with its actuating or controlling means, has been located exteriorly of the tool. By reason of the exterior location of the mechanism or actuating means for the resistance, it is possible in such installations to short-circuit or to bring the electrodes into contact with one another before the protective resistance is introduced into the circuit.

One object of the present invention is to provide a guard or shield which will prevent direct contact of the arcing end of one electrode with the other electrode without first inserting protective resistance in the circuit prior to such contact. This may be accomplished in different ways, one example being shown in the present instance. In this instance, the guard or shield is so arranged that, as one electrode is brought into proximity to the other electrode, the guard or shield first makes contact with the other electrode which, in the present instance, is the work or material to be treated, and as the first-mentioned electrode is brought closer to the other electrode or the work, the guard or shield actuates the protective starting device which latter introduces resistance into the circuit in such a manner that all of such protective resistance is in the circuit at the moment of contact of the electrodes and hence a short-circuit or an overload is avoided. The guard or shield and the protective resistance are also so arranged that the protective resistance is introduced and removed relatively to the arc circuit in successive stages so that the arc may be drawn in successive stages until all the protective resistance is removed from the circuit, and by giving the guard or shield a predetermined range of movement, all the protective resistance will be removed from the circuit only when the arc has such a length as to render an overload impossible.

In the embodiment shown in the drawing for carrying the invention into practice, a portable or hand tool is illustrated, this tool comprising a handle 1, preferably of insulating material, having a collar 2 supported on and insulated from the handle, and a pair of arms 3 extending downwardly and forwardly from the handle. A forked bracket 4 is secured to the collar 2 and extends upwardly and forwardly therefrom, the bracket and the arms 3 serving to support one of the electrodes, the starting or protective resistance, and the associated parts. A guard 5 is also provided to protect the hand of the operator grasping the handle from the heat of the arc. A collar 6 is secured to the bracket 4, the same having insulating bushings 7 fitted in bosses formed at opposite sides thereof, and a metal or electrical conducting body 8 is secured to the arms 3. An electrode holder 9, preferably in the form of a sleeve composed of metal or electrical conducting material, is fitted into a bore formed in the body 8, and this electrode holder extends, in the present instance, through the top of the collar 6. The electrode 10 is fitted into the electrode holder and it is adjustable longitudinally therein. In the present instance, the electrode 10 is in the form of a carbon or other rod and it is held in properly adjusted position in the electrode holder 9 by a set-screw 11 or equivalent means. A disk 12 of insulating material is fitted around the electrode holder 9 above the member 8, and a sleeve 13 of insulating material surrounds the electrode holder and extends from the insulating disk 12 through the collar 6. A suitable number of electrical contacts are provided which correspond to the resistance sections of a rheostat. In the present instance, a set of contacts $R^1$, $R^2$, $R^3$, $R^4$, $R^5$, $R^6$ and $R^7$ are provided, these contacts being insulated from one another by the interposed insulating disks 14 and they are insulated from the electrode holder 9 by the insulating sleeve 13. The contacts $R^1$, $R^2$, $R^3$, $R^4$, $R^5$, $R^6$ and $R^7$ are connected by individual wires, as shown, to the respective terminals $r^1$, $r^2$, $r^3$, $r^4$, $r^5$, $r^6$ and $r^7$ of a rheostat, the latter having resistance units connecting the adjacent terminals, as shown. The wires which are connected to the contacts $R^1$, $R^2$, $R^3$, $R^4$, $R^5$ and $R^6$ may be formed into a cable 15 and extended through the handle, while a relatively heavier wire 16 is preferably used to connect the contact $R^7$ to the terminal $r^7$ of the rheostat, this wire 16 leading from the terminal of the rheostat which introduces no resistance into the circuit and hence carries the full current. This wire 16 may also be extended through the handle.

The guard or shield 17 which automatically controls the amount of resistance in the circuit, according to the distance between the electrodes, may be composed of refractory material, and preferably it is in the form of a hood, as shown, whereby when it is in contact with the metal or material under treatment it will surround and inclose the arc. The guard or shield has an axial passage 18 through which the arcing end of the electrode 10 projects, and a ferrule 19 is attached to the upper end of the guard. A pair of arms 20 and 21 are secured at their lower ends to the ferrule 19 on the guard while the upper portions of these arms are provided with apertured bosses 22 and 23 which are slidable on guide rods 24 and 25 respectively, these rods being secured at their upper ends in the insulating bushings 7 of the collar 6, and compression springs 26 and 27 are preferably provided to yieldingly hold the guard in its lower position. As shown, the springs 26 and 27 are coil springs which encircle the rods 24 and 25 and bear at their ends against the collar 6 and the bosses 22 and 23, respectively. The arms 20 and 21 also have contacts 28 and 29 respectively, which travel along and maintain contact with the body or member 8, and these arms 20 and 21 also have contacts 30 and 31 which are adapted to travel on and to make contact successively with the rheostat contacts $R^1$, $R^2$, $R^3$, $R^4$, $R^5$, $R^6$ and $R^7$. Preferably, the resistance contacts just mentioned and also the body or member 8 have a cross-section such as that shown in Fig. 2, that is to say, T-shaped portions project from diametrically opposite sides thereof, and the sliding contacts on the arms 20 and 21 are correspondingly shaped in order that the movable and stationary contacts will be properly guided and good electrical engagement will be insured between the stationary and movable contacts. The forward ends of the arms 3 are insulated from but are secured to the body or member 8, for example by the screws 32, and it is preferable to provide an insulating disk 33 at the under side of the member 8 to serve as an abutment for the ferrule 19.

Electric current may be obtained from any suitable source. As shown, G represents diagrammatically an electric generator which has one terminal, in the present instance, connected by the wire $g$ to the work or material to be treated which is designated W, the work or material to be treated in such case serving as one electrode for the arc, and the other terminal of the generator is connected by the wire $g'$ to the terminal $r^7$ of the rheostat, the resistance sections of which are connected to the rheostat contacts $R^1$, $R^2$, $R^3$, $R^4$, $R^5$, $R^6$ and $R^7$. It is to be understood that while the contacts for this rheostat are, in the present instance, carried by the tool itself, the rheostat or resistance may be and preferably is located at some stationary point remote from the tool and is connected thereto by suitable flexible conductors. A controlling rheostat may also be connected in series by the wire $g'$ such rheostat or resistance being shown in the present instance and designated Y, it embodying a hand-switch $y$ which is adapted to be manipulated manually to insert more or less resistance within the capacity of this rheostat into the circuit as conditions may require.

In carrying the invention into practice, the tool or apparatus is connected to its source of current supply and to the resistance or rheostats, as shown and described. The handle of the tool is grasped by the hand of the operator and the tool is manipulated to bring the guard 17 into contact with the metal or work to be treated. The tool is then pressed downwardly or toward the work, this causing the springs 26 and 27 to be compressed, and it moves the contacts 30 and 31 successively from the contact $R^7$ to the contact $R^1$ and brings the arcing end of the electrode 18 into contact with the work. As the work constitutes one electrode for the arc, contact therewith of the electrode 18 closes the circuit, but when this occurs, all of the protective starting resistance is in the circuit and hence it is impossible to produce an excessive flow of current. The electric circuit having been established, the operator removes the downward pressure on the tool, thus enabling the springs 26 and 27 to raise the electrode 18, the latter being first disengaged from the work and then moved gradually away from the work to first establish the arc and to subsequently draw the arc to the desired length. During the upward movement of the electrode 18, the guard 17 remains in contact with the work. As the electrode 18 moves away from the work, the contacts 30 and 31 move successively from the contact $R^1$, which inserts the maximum resistance into the circuit, over the contacts $R^2$, $R^3$, $R^4$, $R^5$ and $R^6$ which causes sections of the resistance to be cut out successively, and when the electrode 18 has reached the limit of its movement in a direction away from the work, the contacts 30 and 31 will rest on the contact $R^7$, the full flow of current being then permitted, except as may be regulated by the resistance or rheostat Y. The operator continues to move the tool away from the work W, manipulating at the same time the hand-switch $y$ of the controlling or regulating rheostat Y until the arc assumes the desired volume and length. From the foregoing, it will be seen that it is impossible for the operator to strike the arc without first throwing in protective starting resistance, and if through carelessness or inadvertence the operator should bring the electrode or tool too close to the work, it will be impossible to short-circuit or overload the generator, as it is not possible to bring the electrode closer than a predetermined distance which, in the present case, is determined by the guard 17 when the latter comes in contact with the work, without causing the protective starting resistance to operate, introducing protective resistance into the circuit as the electrode is forced toward the work.

In operating the invention in cases where light variation in volume of current is required and frequent stoppage of the arc is necessary, the regulating resistance Y may be set at a predetermined point and may remain so, as with the arrangement of protective starting resistance shown and described, it will be impossible to overload or short-circuit the generator, and the operator can vary the length and volume of the arc by simply raising or lowering the tool without danger of short-circuit or overload.

The guard 17 when in the form of a hood or bell, as shown, serves not only as a distance gage for the operation of the protective starting device, but it performs the further function of assisting in stabilizing the arc, protecting the operator to a considerable extent from the glare of the arc, and furthermore, it serves to conserve and to reflect the heat of the arc downward or toward the metal or material under treatment. The guard may be made to completely protect the arc and the work at the point under treatment, for example, by raising the electrode 18 only to the extent of travel of the arms 20 and 21 on the contacts, such an adjustment leaving the guard 17 resting upon the work with the arc completely inclosed by the guard. This mode of operation permits the operator to subject the work to excessive heat without exposure to atmospheric influences. It is to be understood, however, that while a guard of the construction just described is preferably used, any part may be used that would serve as a distance gage to mechanically control the protective starting resistance, and furthermore, it will be understood that the present invention contemplates any arrangement of the electrodes and coöperating parts which will prevent the approach of one electrode toward the other without first inserting protective resistance in the circuit prior to contact of the electrodes in establishing the arc.

I claim as my invention:—

1. Method of electric arc welding and heating consisting in subjecting the material to be heated to the heating action of an electric arc and mechanically imparting movement through the movement of one electrode of the arc to a protective starting resistance when one electrode is moved toward the other electrode beyond a predetermined distance to insert such resistance in circuit prior to the contact of the electrodes, thereby preventing an excessive rush of current upon bringing the electrodes in contact and establishing the arc.

2. Method of electric arc welding and heating consisting in subjecting the material to the heating action of an electric arc maintained between two electrodes and mechanically transmitting movement from one electrode of the arc, when such electrode is moved toward the other electrode beyond a predetermined distance, to a protective starting resistance to insert such resistance in circuit in successive stages prior to the contact of the two electrodes, thereby preventing an excessive rush of current upon bringing the electrodes in contact and establishing the arc.

3. Method of electric arc welding and heating consisting in maintaining an electric arc between two electrodes, subjecting the material to be heated to the heating action of said arc and mechanically transmitting movement from one electrode of the arc, when such electrode is moved toward the other electrode of the arc beyond a predetermined distance, to a protective starting resistance to insert the same in circuit in successive stages prior to contact of the electrodes in establishing the arc and subsequently removing such protective resistance from circuit in successive stages as one electrode is withdrawn from the other electrode within the aforesaid predetermined distance.

4. Method of electric arc welding and heating consisting in subjecting the material to the heating action of an electric arc maintained between two electrodes, one of said electrodes comprising the material to be heated and mechanically imparting movement from one electrode of the arc, when said electrode is moved toward the other electrode beyond a predetermined distance, to a protective starting resistance to insert such resistance in circuit in successive stages prior to contact of the electrodes in establishing the arc, and subsequently removing such protective resistance from circuit in successive stages as one electrode is withdrawn from the other electrode within the aforesaid predetermined distance.

5. Method of electric arc welding and heating consisting in subjecting the material to the heating action of an electric arc maintained between two electrodes and mechanically imparting movement from one electrode of the arc to a protective starting device whereby contact of the two electrodes prior to establishing the arc is prevented within an established distance except by actuating the protective starting device which inserts protective resistance in circuit as one electrode approaches the other, thereby preventing an excessive rush of current upon contact of the electrodes when the arc is established.

6. Method of electric arc welding and heating consisting in subjecting the material to the heating action of an electric arc maintained between two electrodes and adjusting a protective resistance in circuit by relative movement of the electrodes whereby the approach of one electrode to the other is prevented beyond an established distance unless the protective resistance is inserted in circuit in successive stages as one electrode approaches the other within such established distance, thereby preventing an excessive rush of current when the arc is established, and subsequently causing the removal of such protective resistance from circuit in successive stages by such mechanical movement when one electrode is withdrawn from the other.

7. In the art of electric arc welding or heating, arranging the two electrodes employed for producing the arc so that one of said electrodes has an established distance to travel while approaching the other electrode, and mechanically transmitting motion by the movement of said electrode through such established distance, to a protective starting resistance whereby it is impossible to remove protective resistance wholly from the circuit of the arc while said electrode is traveling through such established distance.

8. In the art of electric arc welding and heating, arranging the electrodes employed for producing the arc so that one of said electrodes has an established distance to travel while being withdrawn from contact with the other electrode, and mechanically transmitting motion by the movement of said electrode through such established distance, to a protective starting resistance whereby it is impossible to remove protective resistance wholly from the circuit while said electrode is traveling through such established distance.

9. In the art of electric arc welding and heating, electrodes for the arc, and a protective resistance coöperating therewith, whereby one electrode cannot approach the other electrode beyond a predetermined distance without such movement mechanically inserting the protective resistance in circuit prior to establishing the arc.

10. In the art of electric arc welding and heating, electrodes for producing the arc, and a protective resistance coöperating therewith, whereby one electrode cannot approach the other electrode beyond a predetermined distance without such movement first mechanically inserting the protective resistance in circuit prior to establishing the arc, and such protective resistance will be removed as one electrode is withdrawn from the other.

11. In an electric arc welding and heating apparatus, the combination of an electrode for the arc, means for supporting the electrode, a resistance terminal carried on said support connected to an exterior resistance, a contact for such resistance terminal, means for moving such contact over the resistance terminal and in contact therewith, with means for preventing the approach of the electrode toward the other electrode of the arc within a predetermined distance without actuating said contact device and thereby inserting the protective resistance in circuit.

12. In an arc welding and heating apparatus, the combination of an electrode for the arc, means for supporting the electrode, resistance terminals from an exterior resistance carried on said support, a contact device for such resistance terminals, means for moving such contact over the resistance terminals and in contact therewith, means for keeping such contact device in circuit with the electrode, with means for preventing the approach of the said electrode toward the other electrode of the arc within a predetermined distance without actuating such contact device and thereby inserting said resistance in circuit in successive stages.

13. In an arc welding and heating apparatus, the combination of an electrode for the arc, means for supporting said electrode, resistance terminals from an exterior resistance insulated from each other and carried on said support, a circuit terminal carried on said support and insulated from the resistance terminals, a contact device for said resistance terminals and said circuit terminal, means for moving said contact device over and in contact with said terminals successively, means for keeping said contact device in circuit with the electrode, with means whereby the approach of the electrode aforesaid toward the other electrode of the arc beyond a predetermined distance actuates such contact device and inserts the resistance in circuit in successive stages until the entire resistance is in circuit when the two electrodes of the arc make contact.

14. In an arc welding and heating apparatus, the combination of an electrode for the arc, means for supporting the electrode, resistance terminals from an exterior resistance insulated from each other and carried on said support, a circuit terminal carried on said support and insulated from the resistance terminals, a contact device for said resistance terminals and said circuit terminal, means for moving said contact device over and in contact with said terminals successively, means for keeping said contact device in circuit with said electrode, with means whereby the approach of the said electrode toward the other electrode of the arc beyond a predetermined distance actuates such contact device and inserts the resistance in circuit in successive stages until the entire resistance is in circuit when the two electrodes of the arc make contact with means whereby as the one electrode is withdrawn from the other throughout the predetermined distance aforesaid the resistance is removed in successive stages until the contact device rests upon the circuit terminal aforesaid.

15. In an arc welding and heating apparatus, the combination of a source of electric energy, two electrodes in circuit therewith and between which an electric arc is adapted to be drawn, a resistance in said circuit, an electrode holder supporting one electrode of the arc, a terminal from said resistance carried on said support, a contact device adapted to move upon and in contact with said resistance terminal, means for placing said contact device in contact or circuit with the said electrode, and means whereby when one electrode is moved toward the other electrode beyond a predetermined distance the said contact device is actuated and inserts the said resistance in circuit prior to the contact of the one electrode with the other.

16. In an arc welding and heating apparatus, the combination of a source of electric energy, two electrodes for the arc in circuit therewith, one of said electrodes carried on a support adapted to be operated by hand, a resistance in said circuit, terminals from said resistance carried on said support and insulated from each other, a contact device adapted to move upon and in contact with said resistance terminals successively, means for connecting said contact device to said electrode, means actuating said contact device whereby when one of the said electrodes is moved toward the other electrode beyond a predetermined distance the said resistance is inserted in circuit in successive stages until the entire resistance is in circuit when the two electrodes make contact.

17. In an arc welding and heating apparatus, the combination of a source of electric energy, two electrodes for the arc in circuit therewith, one of said electrodes carried on a support adapted to be operated by hand, a resistance in said circuit, terminals from said resistance insulated from each other and carried on said support, a circuit terminal carried on said support and insulated from the resistance terminals, a contact device adapted to move upon and in contact with said circuit terminal and said resistance terminals successively, means for connecting said contact device to said electrode, means actuating said contact device whereby when one of said electrodes is moved toward the other electrode beyond a predetermined distance the said circuit terminal is cut out and the resistance is inserted in circuit in successive stages until the entire resistance aforesaid is in circuit when the two electrodes make contact.

18. In an arc welding and heating apparatus, the combination of a source of electric energy, two electrodes for the arc in circuit therewith, one of said electrodes carried on a support adapted to be operated by hand, a resistance in said circuit, terminals from said resistance insulated from each other and carried upon said support, a circuit terminal insulated from the resistance terminal carried on said support, a contact device adapted to move upon and in contact with said circuit terminal and said resistance terminals successively, means for connecting the said contact device to the said electrode, means actuating said contact device whereby when one of said electrodes is moved toward the other electrode of the arc beyond a predetermined distance the said circuit terminal is cut out and the resistance aforesaid is inserted in circuit in successive stages until the entire resistance is in circuit when the two electrodes make contact, with means whereby as the one electrode is withdrawn from the other electrode within the predetermined distance the aforesaid resistance is removed from circuit in successive stages until said contact device rests on said circuit terminal.

19. In an arc welding and heating apparatus, the combination of a source of electric energy, a working circuit thereof comprising a control resistance in said circuit, a protective starting resistance adapted to be cut in and out of said working circuit, two electrodes for the arc in said circuit, one of said electrodes carried upon a support, terminals from said protective starting resistance carried on said support and insulated from each other, a circuit terminal carried on said support and insulated from the said resistance terminals, a contact device adapted to move upon and in contact with said circuit terminal and resistance terminals successively, means for connecting said contact device to said electrode, means actuating said contact device whereby when one of said electrodes is moved toward the other electrode of the arc beyond a predetermined distance the said circuit terminal is cut out and the protective starting resistance is inserted in circuit in successive stages until the entire protective starting resistance is in circuit when the two electrodes make contact, thereby preventing excessive rush of current, with means whereby as the one electrode is withdrawn from the other electrode within the said predetermined distance the protective starting resistance is removed in successive stages until said contact device rests on said circuit terminal, thereby reëstablishing the working circuit.

20. In an apparatus for electric arc welding and heating, the combination of two electrodes for the arc, means for maintaining an electric arc between said electrodes, a guard or distance gage whereby when one electrode is moved toward the other electrode beyond an established distance determined by said guard resistance is coincidently inserted in circuit prior to contact of the two electrodes.

21. In an electric arc welding or heating apparatus, the combination of two electrodes for producing the arc, means for maintaining an electric arc between the said electrodes, a guard or distance gage whereby when one electrode is moved toward the other electrode beyond an established distance determined by said guard resistance is inserted in circuit coincidently with the approach of one electrode toward the other within said established distance and prior to contact of the electrodes.

22. In an electric arc welding or heating apparatus, the combination of two electrodes for the arc, means for maintaining an electric arc between said electrodes, a guard or distance gage preventing contact between the two electrodes while one electrode is moving toward the other electrode within an established distance without coincidently with such movement inserting resistance in circuit prior to establishing the arc.

23. In an arc welding and heating apparatus, the combination of relatively movable electrodes for the arc, a protective starting resistance, and means operative mechanically by variations in the distance between the electrodes for directly and automatically introducing or removing resistance in the arc circuit.

24. In an arc welding and heating apparatus, the combination of relatively movable electrodes for the arc, a protective starting resistance embodying a series of contacts connected to resistance sections, and means including a contact coöperative with said contacts for automatically and mechanically controlling the amount of resistance in the arc circuit according to the distance apart of the electrodes.

In testimony whereof I have hereunto set my hand in presence of two subscribing witnesses.

CHARLES L. COFFIN.

Witnesses:
J. B. R. BARRETT,
C. H. EDWARDS.